US012252215B2

(12) United States Patent
Philipzik et al.

(10) Patent No.: US 12,252,215 B2
(45) Date of Patent: Mar. 18, 2025

(54) HOLDING DEVICE FOR RELEASABLY SUPPORTING AN ENERGY STORE ON A FRAME, IN PARTICULAR, ON A BICYCLE FRAME

(71) Applicant: Robert Bosch GmbH, Stuttgart (DE)

(72) Inventors: Fabian Philipzik, Tuebingen (DE); Peter Kunert, Lichtenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 414 days.

(21) Appl. No.: 17/634,851

(22) PCT Filed: Jul. 6, 2020

(86) PCT No.: PCT/EP2020/069008
§ 371 (c)(1),
(2) Date: Feb. 11, 2022

(87) PCT Pub. No.: WO2021/043463
PCT Pub. Date: Mar. 11, 2021

(65) Prior Publication Data
US 2022/0281554 A1    Sep. 8, 2022

(30) Foreign Application Priority Data

Sep. 4, 2019  (DE) ..................... 10 2019 213 438.6

(51) Int. Cl.
*B62M 6/90*  (2010.01)
*B62H 5/00*  (2006.01)
(Continued)

(52) U.S. Cl.
CPC .............. *B62M 6/90* (2013.01); *B62H 5/001* (2013.01); *B62J 43/13* (2020.02); *B62J 43/20* (2020.02); *B62K 19/40* (2013.01)

(58) Field of Classification Search
CPC . B62M 6/90; B62H 5/001; B62J 43/13; B62J 43/20; B62J 43/23; B62K 19/40;
(Continued)

(56) References Cited

U.S. PATENT DOCUMENTS 7,575,280 B2 *  8/2009  Palomba ............ B60N 2/01583
                                                297/336
9,914,501 B2 *  3/2018  Marioni .................. B60L 50/20
11,390,188 B2 *  7/2022  Tachikawa ......... B60N 2/01583

FOREIGN PATENT DOCUMENTS

CN      205468501 U  *  8/2016
CN      207225520 U  *  4/2018
(Continued)

OTHER PUBLICATIONS

DE-202016008481-U1 English translation (Year: 2018).*
(Continued)

*Primary Examiner* — James A Shriver, II
*Assistant Examiner* — Michael T. Walsh
(74) *Attorney, Agent, or Firm* — NORTON ROSE FULBRIGHT US LLP; Gerard A. Messina (57) ABSTRACT

A holding device for releasably supporting an energy store, in particular, an energy store for a bicycle, on a frame, in particular, on a bicycle frame. The holding device includes at least one locking unit, which is intended, in a locked state, for axially fixing the energy store in position and releasably locking it. The locking unit includes at least one first locking element and at least one second locking element corresponding to the first locking element.

14 Claims, 4 Drawing Sheets

(51) Int. Cl.
*B62J 43/13* (2020.01)
*B62J 43/20* (2020.01)
*B62K 19/40* (2006.01)

(58) Field of Classification Search
CPC ...... B60L 2200/12; B60L 50/20; B60L 50/66; B60L 50/64; Y02T 10/70; H01M 50/20
See application file for complete search history.

(56) References Cited

FOREIGN PATENT DOCUMENTS

| | | | | |
|---|---|---|---|---|
| DE | 202011001232 U1 * | 4/2011 | ............. | B62M 6/90 |
| DE | 202016008481 U1 * | 3/2018 | ............. | B60L 50/64 |
| EP | 2280436 A2 | 2/2011 | | |
| EP | 2862791 A1 | 4/2015 | | |
| EP | 2280436 B1 * | 8/2017 | ............... | B60K 1/04 |
| JP | 2010235006 A | 10/2010 | | |
| JP | 5093223 B2 * | 12/2012 | ......... | B60N 2/01583 |
| JP | 5193553 B2 * | 5/2013 | ......... | B60N 2/01583 |
| JP | 2017043340 A * | 3/2017 | .............. | B62M 6/90 |

OTHER PUBLICATIONS

DE-202011001232-U1 English translation (Year: 2011).*
CN-207225520-U English translation (Year: 2018).*
EP-2280436-B1 English translation (Year: 2017).*
CN-205468501-U English translation (Year: 2016).*
JP-2017043340-A English translation (Year: 2017).*
International Search Report for PCT/EP2020/069008, Issued Oct. 5, 2020.

* cited by examiner

HOLDING DEVICE FOR RELEASABLY SUPPORTING AN ENERGY STORE ON A FRAME, IN PARTICULAR, ON A BICYCLE FRAME

BACKGROUND INFORMATION

A holding device for releasably supporting an energy store, in particular, an energy store for a bicycle, on a frame, in particular, on a bicycle frame, including at least one locking unit, which is intended, in a locked state, for axially fixing the energy store in position and releasably locking it, has already been provided in the related art.

SUMMARY

The present invention relates to a holding device for releasably supporting an energy store, in particular, a bicycle storage battery, on a frame, in particular, on a bicycle frame, including at least one locking unit, which is intended, in a locked state, for axially fixing the energy store in position and releasably locking it.

In accordance with an example embodiment of the present invention, it is provided that the locking unit include at least one first locking element and at least one second locking element corresponding to the first locking element. The embodiment of the holding device according to the present invention may advantageously allow an energy store to be fixed in position axially and locked releasably, in particular, in and/or on a bicycle frame, in a simple and/or secure manner. In a locked state of the locking unit, slipping or loosening of the energy store may be counteracted advantageously by the locking unit, in particular, prevented to the greatest possible extent, even in the case of intense vibration; and, in particular, reliable electrical contacting of the energy store may be ensured. The energy store may advantageously be locked and/or unlocked by a user, without a tool. A high level of user-friendliness may be attained in an advantageous manner.

In accordance with an example embodiment of the present invention, the holding device preferably takes the form of a holding device for a bicycle energy store. In particular, the holding device is intended to allow an energy store to be positioned at least temporarily in and/or on a frame, in particular, in and/or on a bicycle frame, and, in particular, to allow the energy store to be fixed in position axially and locked releasably within this temporary positioning, as well as to ensure electrical contacting of the energy store. The holding device includes at least the locking unit for axial fixation, releasable locking, and electrical contacting of the energy store. The holding device preferably includes at least one carrier unit having at least one carrier element and at least one connecting element. The at least one carrier element of the carrier unit preferably forms a guide rail, which is designed, in particular, for guiding and, in so doing, predetermining, in particular, an axis of movement for the energy store during installation, in particular, during insertion, and/or during detachment, in particular, during extraction. In particular, the guide rail may at least be provided to predetermine an orientation of the energy store upon insertion of the energy store into the holding device. In particular, the holding device is designed to be fixed in position on a bicycle frame, preferably, in a bicycle frame, for example, in a top tube, a seat tube, a head tube or, preferably, a down tube, of the bicycle frame. Alternatively, or in addition, it is possible for the holding device, preferably, the carrier unit or the carrier element, to be formed at least partially in one piece with the bicycle frame, or for at least a part of the holding device, preferably, the carrier unit or the carrier element, to be connected, for example, welded or bonded, to the bicycle frame in one piece. In this manner, incorrect mounting and/or damage to the energy store and/or to the holding device may be prevented. Alternatively, it is possible for the holding device to be formed free of a carrier unit, and for the energy store to be able, in the locked state, to be connected to the holding device by the locking unit, directly via at least one connecting element situated on the energy store and/or connected directly to the energy store. The at least one connecting element may be formed in one piece with the energy store or connected to the energy store in a form-locked or friction-locked manner. In particular, the holding device is designed to be fixed in position in the frame, preferably, in the bicycle frame, for example, in a top tube, a seat tube, a head tube or, preferably, a down tube of the bicycle frame. The holding device includes, in particular, fastening elements, such as screw, plug or snap-in locking elements, for fixing it in position in or on the bicycle frame. In this context, "fixation" shall be understood as, in particular, a positionally fixed and/or rotationally fixed connection. Alternatively, or in addition, it is possible for the holding device to be formed at least partially in one piece with the bicycle frame, or for at least a part of the holding device, in particular, the locking unit, to be welded or bonded to the bicycle frame in one piece. "In one piece" shall be understood as, in particular, integrally connected, such as by a welding operation and/or adhesive bonding process, etc., and, particularly advantageously, as molded, such as manufactured by casting and/or manufactured in a one-component or multi-component injection-molding method. One-piece should also be advantageously understood as one-part. "One-part" is to be understood as, in particular, formed in one piece. This one piece is preferably made of a single blank, a mass and/or a casting, particularly preferably, in an injection molding operation, in particular, a single-component and/or multicomponent injection molding operation. "Form-locked" is to be understood to mean, in particular, that contiguous surfaces of components interconnected in a form-locked manner exert a retention force on each other acting in a normal direction of the surfaces. In particular, the components are in geometric engagement with each other.

An "energy store" is to be understood as, in particular, a component, which is able to absorb, store and emit energy, in particular, chemical and/or, preferably, electrical energy. In particular, the energy store may take the form of a gas and/or liquid tank. In particular, the energy store may take the form of an electrochemical capacitor and/or a fuel cell. The energy store preferably takes the form of a battery, in particular, a storage battery, preferably, a storage battery for a bicycle. In particular, the energy store is designed to supply energy for a drive unit of a bicycle, for example, for an auxiliary motor of an e-bike or a pedelec.

A "locking unit" shall be understood as, in particular, a unit, which is configured, in a locked state, to axially fix the energy store in position and to lock it releasably. The locking unit preferably includes at least the first locking element and at least the second locking element corresponding to the first locking element. The first locking element and the second locking element are preferably movably supported, in particular, pivoted, on a base of the locking unit. The first locking element and the second locking element preferably take the form of locking catches, which are pivoted on the locking unit and correspond to each other; in the locked state, the first locking element blocking a rotation of the second locking element in a locking position. Alternatively, or in addition, the first and/or the second locking element and/or further locking elements of the locking unit could also take the form of catch bolts and/or bent levers and/or corresponding snap-in locking elements and/or snap fastener elements. In particular, geometric shaping and/or a material and/or function of the first locking element may be different from geometric shaping and/or a material and/or a function of the second locking element and/or further locking elements. The outer contours of the first and the second locking element are preferably such, that in the locked state, the locking elements may enter into a form-locked and/or friction-locked connection. The locking unit is preferably part of the holding device. However, it is also possible for the locking unit or additional individual units and/or elements of the locking unit, in particular, locking elements, to be part of the energy store and to be connected to the energy store in a form-locked and/or friction-locked manner or to be formed in one piece with it. During installation of the energy store in the holding device, correct positioning in the locking unit and/or attainment of the locked state of the locking unit may advantageously be signaled to a user by, in particular, an acoustic signal, such as a click. The first locking element and the second locking element are preferably inaccessible from the outside and situated completely inside of the base of the locking unit. In this manner, unauthorized access and unauthorized cancellation of the locked state of the locking unit may be advantageously prevented. Protection of the energy store against theft may be increased in an advantageous manner. That a locking element is formed to "correspond" to another locking element, is to be understood to mean, in particular, that the locking elements are matched to each other by suitable positioning and/or geometric shaping and/or material selection and interact, in particular, to lock and/or unlock an object. A "locked state" is to be understood, in particular, as a state, in which in the holding device, the energy store is fixed in position axially and, in particular, securely retained in a locking position with the aid of the locking unit. In this context, "fixed in position axially" is to be understood as, in particular, a positionally fixed and/or rotationally fixed connection of the energy store on an axis running along or parallel to a major direction of extension of the energy store. In this context, a "major direction of extension" of an object is to be understood, in particular, as a direction, which runs parallelly to the longest edge of the smallest geometric, right parallelepiped, which only just encloses the object completely. "Designed" is to be understood as, in particular, specially configured and/or specially equipped. That an object is intended for a particular function, is to be understood to mean, in particular, that the object fulfills and/or executes this particular function in at least one application state and/or operating state.

In accordance with an example embodiment of the present invention, in addition, the first locking element and the second locking element are movably supported, in particular, pivoted, on the locking unit; in the locked state, the first locking element blocking a motion, in particular, a rotation, of the second locking element. This may advantageously enable particularly secure locking of the energy store, using especially simple technical devices. "Pivoted" shall be understood to mean, in particular, that an object is supported on a fixed axis of rotation, and that in at least one operating state different from the locked state, it may be moved at least partially about the axis of rotation in at least one direction of rotation. Alternatively, it is possible for the first locking element and/or the second locking element to be supported on the base of the locking unit in such a manner, that a translational motion is allowed in at least one operating state different from the locked state. In addition, it is possible for only the first locking element or only the second locking element to be movable, and for the second locking element or the first locking element to be connected to the base of the locking unit in a stationary manner. For example, in particular, in an alternative embodiment, it is possible for the first locking element to take the form of a snap-in locking element, such as a detent slot, connected to the base of the locking unit in a stationary manner, while the second locking element takes the form of a movably supported detent element, such as a detent hook, and latches to the first locking element in the locked state.

Furthermore, in accordance with an example embodiment of the present invention, it is provided that the locking unit have at least one tensioning unit, which is designed to prestress at least the first locking element and/or the second locking element in the locked state, using a tensional force. This may advantageously allow particularly secure and/or positionally accurate axial fixation of the energy store. The tensioning unit preferably includes at least one tensioning element, which is positioned on the first locking element or on the second locking element and is connected to the first locking element or to the second locking element, in particular, in a form-locked and/or friction-locked manner. In particular, the tensioning unit may include a plurality of tensioning elements. At least one tensioning element of the tensioning unit is advantageously positioned, in each instance, on the first locking element and on the second locking element of the locking unit. Preferably, a first tensioning element is positioned on the first locking element, and a second tensioning element is positioned on the second locking element. In particular, the first tensioning element and the second tensioning element and/or a further tensioning element of the tensioning unit may be designed at least partially differently and/or be positioned on a locking element of the locking unit and/or connected to a locking element of the locking unit in a different manner. In particular, a tensional force, with the aid of which the first locking element is prestressed by the first tensioning element of the tensioning unit, may differ from at least one further tensional force, with the aid of which the second locking element is prestressed by the second tensioning element of the tensioning unit and/or a further locking element is prestressed with the aid of a further tensioning element, in particular, with regard to a magnitude and/or with regard to a point of application of a force and/or with regard to a direction, in which the tensional force acts. A "tensioning element" is to be understood as, in particular, a macroscopic element, which has at least an extension that, in a normal operating state, may change elastically by at least 10%, in particular, by at least 20%, preferably, by at least 30%, and particularly advantageously, by at least 50%, and which generates, in particular, a reaction force, which is a function of a change in the extension, is preferably proportional to the change, and counteracts the change. An "extension" of an element is to be understood as, in particular, a maximum spacing of two points of a vertical projection of the element onto a plane. A "macroscopic element" is to be understood as, in particular, an element having an extension of at least 1 mm, in particular, at least 5 mm, and preferably, at least 10 mm. A tensional force exerted by a tensioning element of the tensioning unit is preferably conditioned by the dependent reaction force generated in response to an elastic change in the extension of the tensioning element and is, in particular, proportional to this reaction force. The first tensioning element, the second tensioning element and/or a further tensioning element of the tensioning unit preferably takes the form of a spring, in particular, a torsion spring, and advantageously, a leg spring and/or torsion spring, and is made of, in particular, a metal and/or metal alloy, preferably, steel, and particularly preferably, spring steel. Alternatively, it is possible for the first tensioning element, the second tensioning element and/or a further tensioning element of the tensioning unit to take the form of an elastic element different from a spring, as well, and/or to be made of, for example, a plastic and/or a composite material.

In addition, in accordance with an example embodiment of the present invention, it is provided that the tensioning unit be formed in such a manner, that when the locked state is lifted, the tensioning unit ejects the energy store, using the tensioning force. In particular, simple removal of the energy store by a user may be advantageously achieved. A high level of user-friendliness may be attained in an advantageous manner. In particular, in a locked state, at least the first locking element or the second locking element of the locking unit is prestressed by at least the first tensioning element or the second tensioning element of the tensioning unit in such a manner, that a direction of the tensional force is oriented in an ejection direction of the energy store. In response to the cancellation of the locked state for removal of the energy store from the holding device, the tensional force preferably acts upon the energy store in such a manner, that it is ejected from the holding device in the ejection direction. In particular, in response to the rescindment of the locked state, the tensional force exerted by the second tensioning element on the second locking element acts in such a manner, that it causes the second locking element to rotate in the ejection direction. In particular, in response to removal of the locked state, the tensional force exerted by the second tensioning element on the second locking element acts upon the second locking element in such a manner, that the second locking element ejects the connecting element, which is fixed in position within a recess of the second locking element in the locked state and is connected to the carrier unit or the energy store, in the ejection direction with the aid of a rotational motion. In particular, the connecting element takes the form of a pin and has a circular cross section. In the locked state, the connecting element is fixed in position within the recess of the second locking element of the locking unit and forms a form-locked connection with an outer contour of the recess of the locking element having a semicircular cross section. In the locked state, a center point of the connecting element is situated on an imaginary line, which runs perpendicularly to the ejection direction, through a midpoint of an axis of rotation of the first locking element pivoted on the locking unit, and through a midpoint of an axis of rotation of the second locking element pivoted on the locking unit. When the locked state is canceled, the tensional force exerted on the second locking element by the tensioning element, which is connected to the second locking element, in particular, in a form-locked or friction-locked manner, acts upon the second locking element in such a manner, that it rotates with the connecting element along its axis of rotation, in the ejection direction, up to a limit-stop point, and in so doing, ejects the connecting element in the ejection direction. That the energy store is "ejected," should be understood to mean, in particular, that in the case of removal of the locked state, the energy store is moved into a position intended for removal of the energy store.

In addition, in accordance with an example embodiment of the present invention, the holding device includes an actuating unit, which, in particular apart from a key for manipulating a lock, is intended for the tool-less actuation of the locking unit by a user. The actuating unit may be, in particular, part of the locking unit and/or have component parts in common with the locking unit. Particularly simple locking and unlocking of the locking unit, and consequently, particularly simple installation, particularly simple detachment, or particularly simple replacement of the energy store may be rendered possible in an advantageous manner. In particular, the locking unit is configured to be operated purely by hand via the actuating unit. The actuating unit preferably includes at least one actuating element. In particular, the locking unit is actuated via a form-locked and/or friction-locked connection between the at least one actuating element and at least the first locking element or the second locking element, using, for example, an actuating element taking the form of a knob or a lever, and/or using an actuating element taking the form of a lock. In particular, the at least one actuating element is positioned, in particular, exclusively, directly on the locking unit, in particular, on the base of the locking unit, and is connected directly to at least the first locking element or the second locking element of the locking unit; in this case, actuation by a user being able to take place directly on the locking unit. Alternatively, or in addition, it is possible for the actuating unit to include a plurality of actuating elements and/or further units and/or elements, which are connected to the first locking element and/or to the second locking element. In particular, a further actuating element could be situated at an arbitrary position of the frame and/or on a component connected to the frame, in particular, at a position easily accessible to a user, for example, on a guide lever connected to the frame. For example, a first actuating element could be positioned directly on at least one of the locking elements and connected to a further actuating element, for example, to a lever situated on the handlebars of the frame, via a mechanically movable element for transmitting tensional and/or compressive forces, in particular, via a Bowden cable. Alternatively, or in addition, it is also possible for the actuating unit to be controlled and/or driven electromechanically, electronically and/or magnetically and to include, to this end, suitable units and/or components, such as a motor and a gear unit, and/or control and switching elements, as well as further electrical and/or electronic components. In this connection, it is also possible for a locked and/or unlocked state of the locking unit to be indicated and/or outputted to an operator by an optical and/or acoustic signal, for example, via a display or a loudspeaker of an operating unit connected to the actuating unit, and/or with the aid of a smart phone connected via an interface and/or another mobile device.

Furthermore, in accordance with an example embodiment of the present invention, it is provided that the actuating unit include at least one security mechanism for protection against unauthorized actuation of the locking unit. A high level of security may advantageously be attained for a user. Unauthorized access to the energy store may advantageously be prevented to the greatest possible extent. A high level of theft protection for the energy store may advantageously be achieved by the security mechanism. A security mechanism may be implemented, for example, by a lock. The lock may be connected, in particular, in a form-locked and/or friction-locked manner, to the actuating element of the actuating unit; the actuating unit being able to be operated by a user with the aid of a key or, in the case of a combination lock, by setting a numerical code. Alternatively, or in addition, in particular, in embodiments, in which the actuating unit is controlled and/or driven electromechanically, electronically and/or magnetically, it is possible for the security mechanism to be an electrically and/or electronically controlled security mechanism, and for authorization to manipulate the actuating unit to take place through a user, for example, by inputting a PIN code and/or a pattern and/or a scan of a fingerprint, or by facial recognition, via an operating unit connected to the actuating unit, and/or via an interface, using a smartphone and/or another mobile device.

In addition, in accordance with an example embodiment of the present invention, it is provided that the locking unit include at least one damping element for fixing the energy store in position without play. In this manner, manufacturing- and/or application-dependent free space for the energy store to move inside of the holding device may be kept small, which means that slipping or loosening of the energy store may be prevented to the greatest possible extent, even in the case of intense vibration. At least one tensioning element of the tensioning unit is preferably formed in such a manner, that it additionally acts as a damping element, as well. Alternatively, or in addition, it is possible for the locking unit to include one or more damping elements, which are formed differently and/or separately from a tensioning element of the tensioning unit. In particular, a damping element may take the form of a spring, in particular, a compression spring, advantageously, a torsion spring, and preferably, a leg and/or torsion spring. At least one damping element could alternatively or additionally take the form of a pneumatic spring, as well, for example, a gas-filled spring. Furthermore, at least one damping element could also take the form of a rubber element, in particular, a rubber pad and/or a cushioning element and/or a cellular plastic element, in particular, a cellular plastic sheet, in particular, made of polyurethane foam, positioned laterally on the locking unit, and/or another, in particular, elastic, element, which has damping characteristics and material characteristics suitable for play-free fixation and is made of plastic and/or a composite material and/or another suitable material.

In addition, in accordance with an example embodiment of the present invention, the locking unit has at least one contacting unit for contacting the energy store electrically. The contacting unit preferably includes at least one electrically conductive contacting element having at least one electrically positive pole and at least one electrically negative pole. The at least one contacting element of the contacting unit may take the form of a spring contact. The at least one contacting element of the contacting unit is preferably made of an electrically conductive metal, in particular, copper, and/or an electrically conductive metal alloy, in particular, a copper alloy. The at least one contacting element of the contacting unit is preferably designed to be form-locked and/or friction-locked to a base of the locking unit. The at least one contacting element is preferably situated laterally adjacent to the first locking element in the ejection direction, on an upper inner surface of the locking unit. Alternatively, it is possible for the at least one contacting element to be situated laterally adjacent to the second locking element in the ejection direction, on a lower inner surface of the locking unit. In addition, it is alternatively possible for the first contacting element to be formed in one piece with the first locking element and/or the second locking element of the locking unit, or to be connected to the first locking element and/or to the second locking element in a form-locked and/or friction-locked manner. It is possible for the energy store and the contacting unit to include a mechanism for protecting against electrical contacting with incorrect polarity. In particular, electrical contacting of the energy store and locking by the locking unit could be coupled to each other in such a manner, that incorrect contacting may be ruled out and electrical contacting of the energy store is only present, if, in the locked state, the energy store is fixed in position axially with the aid of the locking unit. This may advantageously prevent damage to the energy store and/or to the contacting unit caused by incorrect polarity. In this manner, particularly reliable electrical contacting of the energy store may be advantageously achieved in a locked state of the locking unit. In particular, an electrical contact between the energy store and a power consumer, for example, an electrical contact between an energy store taking the form of a storage battery and a power consumer taking the form of an auxiliary motor of an e-bike or a pedelec is enabled in a particularly simple and reliable manner. Reliable and error-free electrical contacting of the energy store in the locked state may advantageously be allowed, even in the case of intense vibration. In addition, a particularly compact and space-saving construction of the holding device may be rendered possible in an advantageous manner. Alternatively, it is possible for a contacting unit for electrical contacting to be provided on a further unit of the holding device different from the locking unit, or directly on a frame element of the frame.

Furthermore, the present invention relates to a frame, in particular, a bicycle frame, including the holding device of the present invention and at least one frame element. In accordance with an example embodiment of the present invention, it is provided that the locking unit be integrated directly in the frame element. The locking unit is preferably integrated in a frame element taking the form of a down tube of the bicycle frame. In particular, the entire holding device and the energy store may be integrated directly in the frame element, in particular, in the frame element taking the form of a down tube. This may advantageously allow a particularly space-saving set-up of the locking unit to be achieved. The locking unit and/or elements of the locking unit, in particular, locking elements of the locking unit, are preferably positioned in the frame element so as to be inaccessible from the outside. Unauthorized access to the energy store may advantageously be prevented to the greatest possible extent. Alternatively, it is possible for only parts of the holding device, in particular, individual units and/or elements of the holding device, in particular, the locking unit, to be integrated in the frame element.

In this connection, the holding device of the present invention and/or the frame of the present invention shall not be limited to the use and specific embodiment described above. In particular, in order to achieve a functionality described here, the holding device of the present invention and/or the frame of the present invention may have a number of individual elements, component parts and units different from a number mentioned here. In addition, in the ranges of values indicated in this description, values lying within the above-mentioned limits are also to be acknowledged as described and as applicable as desired.

BRIEF DESCRIPTION OF THE DRAWINGS

Further advantages of the present invention are derived from the description of the figures that follows. An exemplary embodiment of the present invention is depicted in the figures. The figures and the description include numerous features in combination. One skilled in the art will necessarily consider the features individually, as well, and unite them to form useful, further combinations, in view of the disclosure herein.

DETAILED DESCRIPTION OF EXAMPLE EMBODIMENTS

Figure 1:
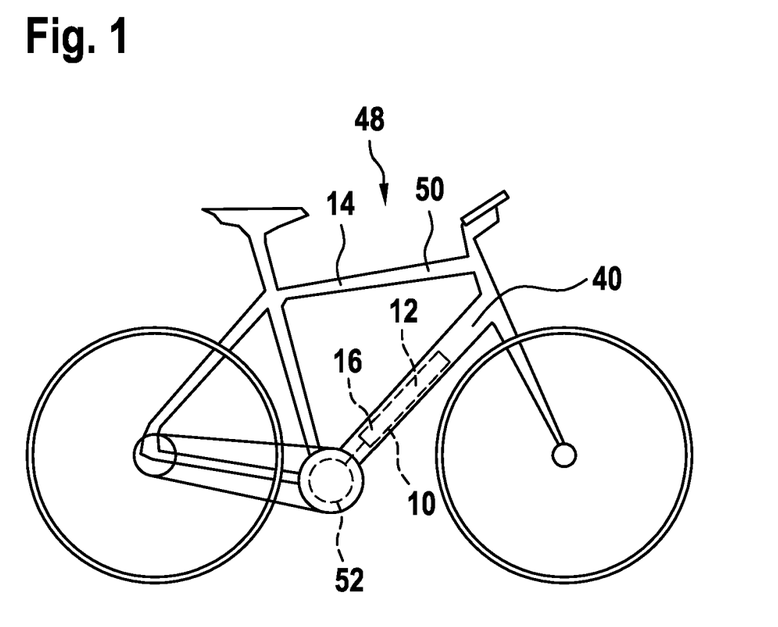
FIG. 1 shows a schematic representation of a bicycle having a bicycle frame according to an example embodiment of the present invention and a holding device according to the present invention.

FIG. 1 shows a bicycle 48 having a frame 14, in particular, a bicycle frame. Frame 14 includes a holding device 10 for releasably supporting an energy store 12, in particular, an energy store for a bicycle, on frame 14. Holding device 10 includes at least one locking unit 16, which is intended, in a locked state 18, for fixing energy store 12 axially in position and locking it releasably. Bicycle 48 includes an auxiliary motor 52 and an energy store 12. Bicycle 48 takes the form of a pedelec. Energy store 12 is provided for supplying auxiliary motor 52 with electrical power. Energy store 12 takes the form of a storage battery. Frame 14 takes the form of a bicycle frame 50. Bicycle frame 50 includes a frame element 40. Frame element 40 is formed to be tubular. Tubularly formed frame element 40 has a circular cross-section, but could have, as an alternative, an oval, angular, or differently shaped cross-section, as well. Locking unit 16 of holding device 10 is integrated directly in frame element 40 of frame 14.

Figure 2:
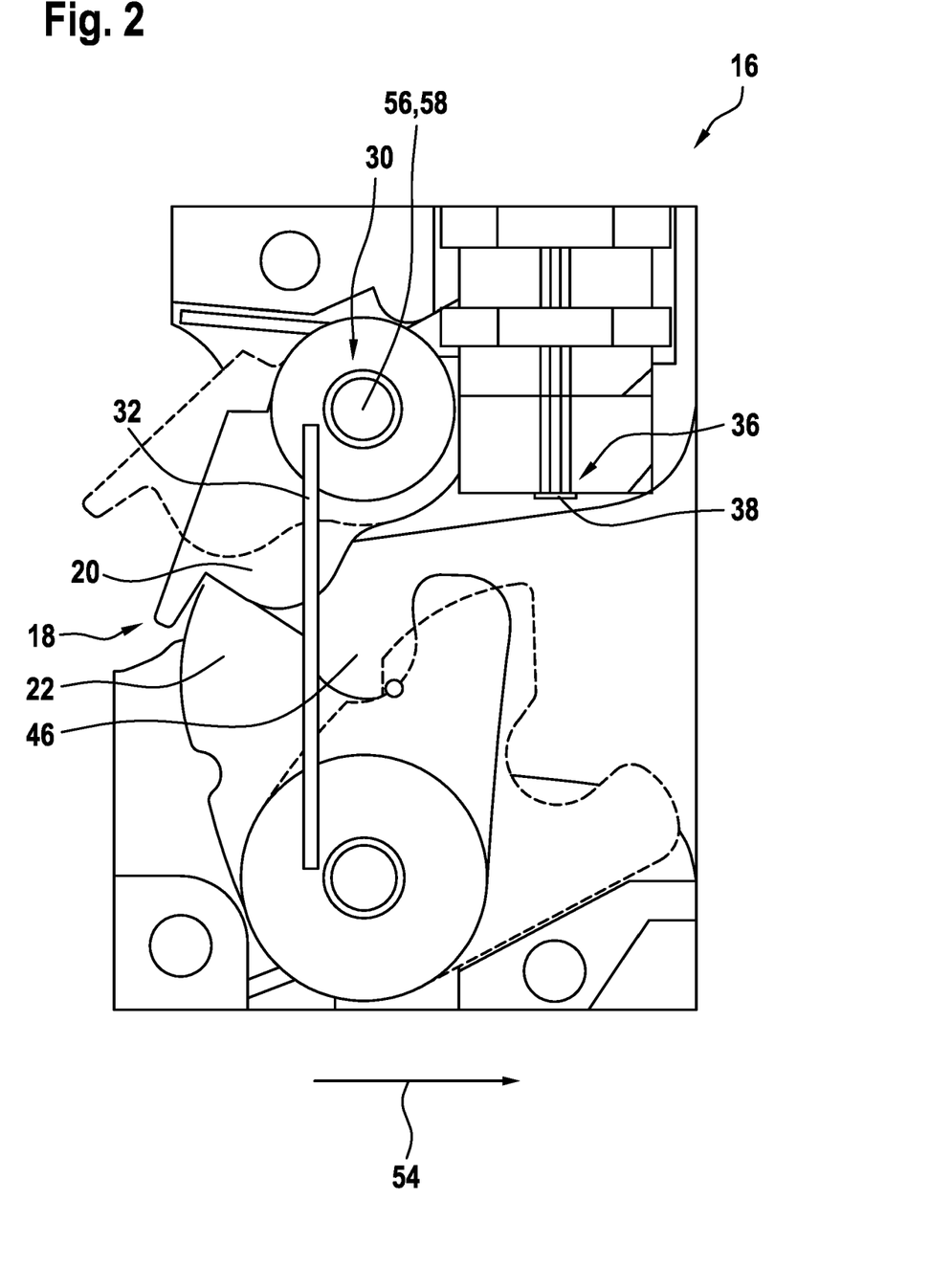
FIG. 2 shows a schematic representation of a locking unit of the holding device according to an example embodiment of the present invention.
Figure 3:
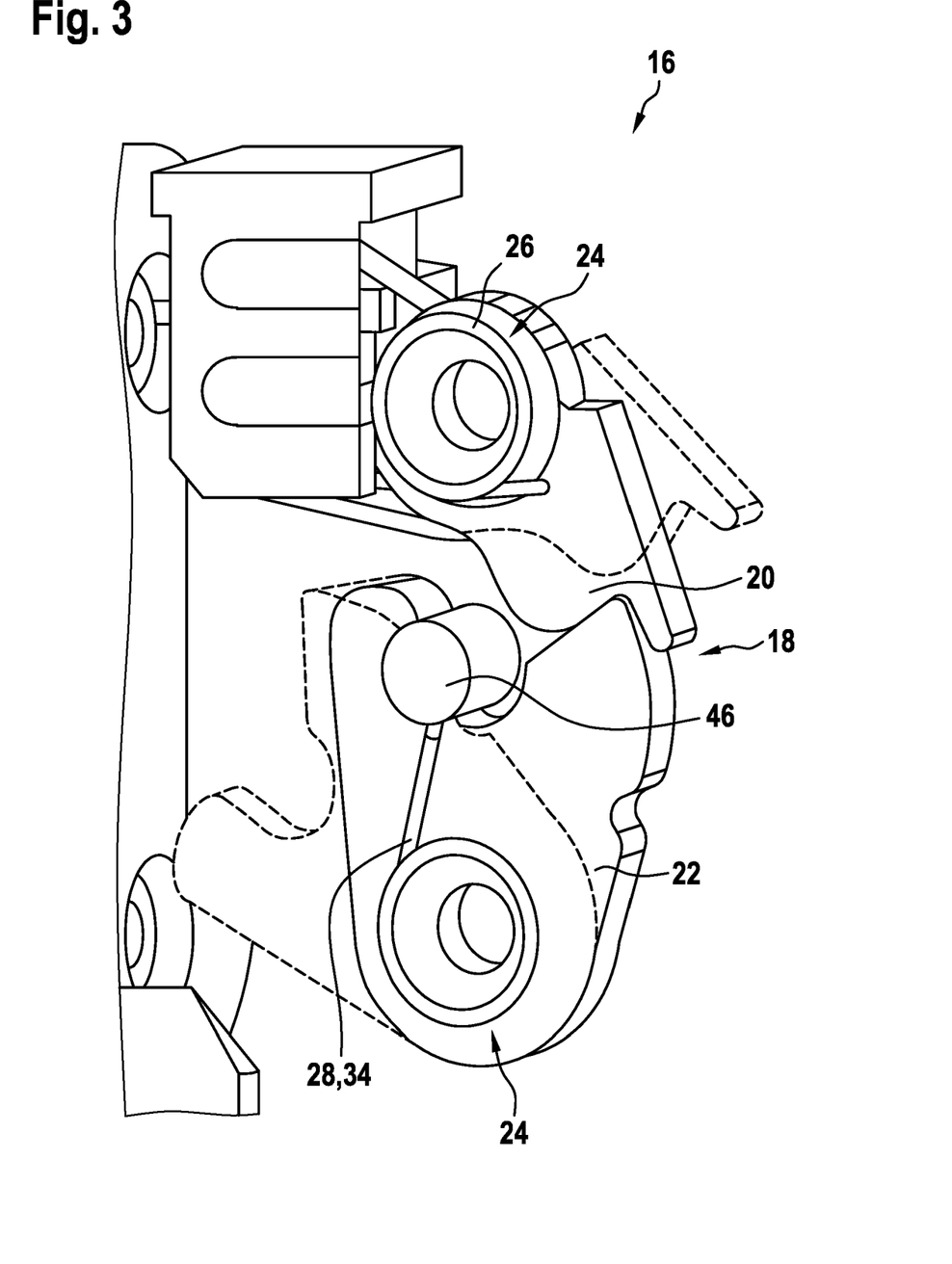
FIG. 3 shows a schematic representation of a further view of the locking unit.

FIG. 2 and FIG. 3 show two different schematic views of locking unit 16 of holding device 10 from different perspectives. Locking unit 16 is intended for axially fixing the energy store in position and locking it releasably inside of holding device 10. Locking unit 16 includes a first locking element 20 and a second locking element 22 corresponding to first locking element 20. In FIGS. 2 and 3, first locking element 20 and second locking element 22 are represented in two different positions. In a first position, first locking element 20 and second locking element 22 are represented by a dashed line and show an unlocked state of locking unit 16. In a second position, first locking element 20 and second locking element 22 are represented by a solid line and show locking unit 16 in a locked state 18. In locked state 18, a connecting element 46 is fixed in position within a recess of second locking element 22 having a semicircular cross section. Connecting element 46 takes the form of a pin, which has a circular cross-section, but could have, as an alternative, an oval, angular, or differently shaped cross section, as well. Connecting element 46 is presently situated on a carrier unit 42 for receiving energy store 12. As an alternative, connecting element 46 could, however, be part of energy store 12, as well, and be situated directly on energy store 12. First locking element 20 and second locking element 22 are pivoted on a base of locking unit 16. First locking element 20 and second locking element 22 are interconnected by a bar element 32 of locking unit 16. When connecting element 46 is inserted into locking unit 16, in a direction opposite to an ejection direction 54, connecting element 46 is pressed against second locking element 22. Second locking element 22 carries out a rotation. Since first locking element 20 is connected to second locking element 22 by bar element 32, first locking element 20 simultaneously carries out a rotation in a direction of rotation opposite to a direction of rotation of second locking element 22, until locked state 18 is reached. In locked state 18, first locking element 20 blocks a further rotation of second locking element 22. Due to the shape of the outer contour of first locking element 20, first locking element 20 forms a limit stop for second locking element 22.

Locking unit 16 includes an actuating unit 30 for toolless manipulation of locking unit 16 by a user. Actuating unit 30 includes an actuating element 56. Actuating element 56 takes the form of a lock 58 and is connected to first locking element 20 in a form-locked manner. However, as an alternative, actuating element 56 could also take the form of a knob or a lever or a different actuating element. Lock 58 forms a security mechanism of actuating unit 30 for protection against unauthorized actuation of locking unit 16. With the aid of a key (not shown), a user may actuate locking unit 16 in an otherwise toolless manner.

FIG. 3 shows a tensioning unit 24 of locking unit 16. Tensioning unit 24 is intended for pre-stressing first locking element 20 and/or second locking element 22 in the locked state 18 with the aid of a tensional force. Tensioning unit 24 includes a first tensioning element 26 and a second tensioning element 28. First tensioning element 26 takes the form of a torsion spring and is rigidly connected to first locking element 20.

In the locked state 18, first tensioning element 26 pre-stresses first locking element 20 with the aid of a tensional force. Second tensioning element 28 takes the form of a further torsion spring and is rigidly connected to second locking element 20. In the locked state 18, second tensioning element 28 prestresses second locking element 22 with the aid of a tensional force.

When locked state 18 is removed, tensioning unit 24 ejects energy store 12 in ejection direction 54 with the aid of the tensional force exerted on second locking element 22 by second tensioning element 28. Locked state 18 is ended by turning a key in actuating element 56 of actuating unit 30 in a direction contrary to the tensional force exerted on first locking element 20 by first tensioning element 26; the actuating element taking the form of a lock 58 and being connected to first locking element 20 of locking unit 16 in a form-locked manner. In an operating state of the locking unit different from locked state 18, second locking element 22 is not blocked by first locking element 20 and may rotate. Due to the tensional force exerted by second tensioning element 28 on second locking element 22, second locking element 22 rotates into the position represented by dashed lines and pushes connecting element 46, and thus, energy store 12, out of locking unit 16.

Locking unit 16 includes a damping element 34. In this case, it is preferable for second tensioning element 28 to simultaneously take the form of damping element 34. In locked state 18, the second tensioning element 28 taking the form of damping element 34 exerts a bias and is intended for fixing the energy store in position without play. Due to the tensional force of the tensioning element 28 taking the form of damping element 34, damping element 34 performs a damping function when connecting element 46 is pushed into locking unit 16. Alternatively, or in addition, damping element 34 could also be constructed as a further spring formed differently from the second tensioning element 28 taking the form of a torsion spring, or as a rubber element, a cushioning element, or a sheet made of a cellular plastic such as polyurethane, or as a further element for damping and fixing energy store 12 in position without play.

Locking unit 16 includes a contacting unit 36. Contacting unit 36 includes a contacting element 38 and is designed to contact energy store 12 electrically. In locked state 18, electrical contact is established between energy store 12 and auxiliary motor 52 by contacting element 38 of contacting unit 36, and energy store 12 supplies auxiliary motor 52 with power (cf. FIG. 1).

Figure 4A:
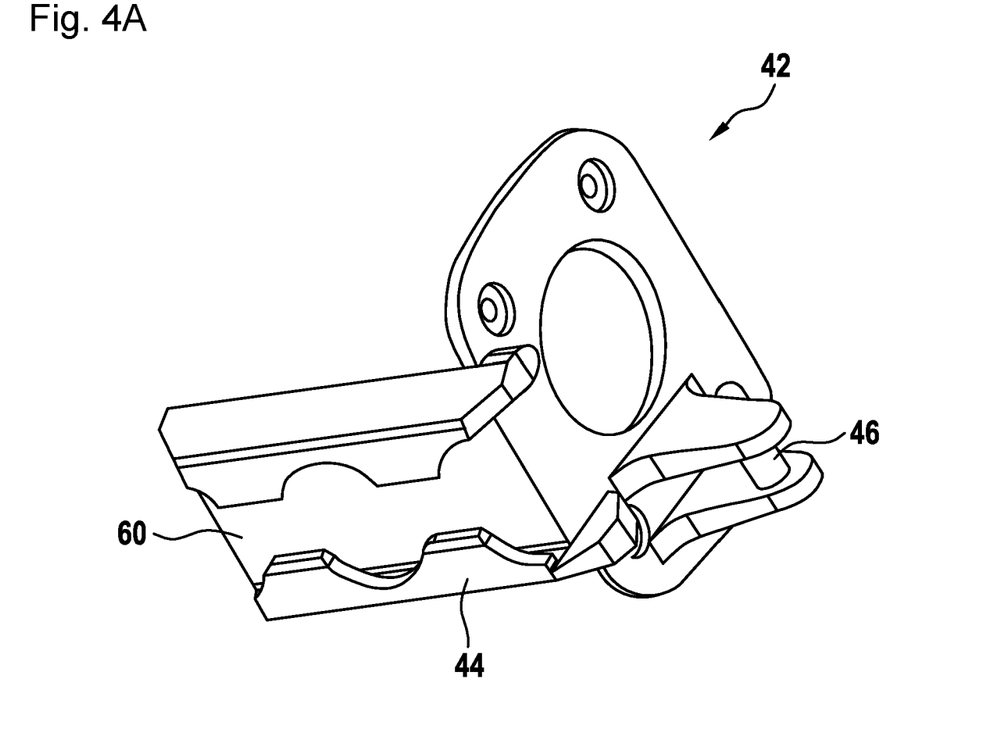
FIG. 4A shows a schematic representation of a carrier unit of the holding device according to an example embodiment of the present invention.
Figure 4B:
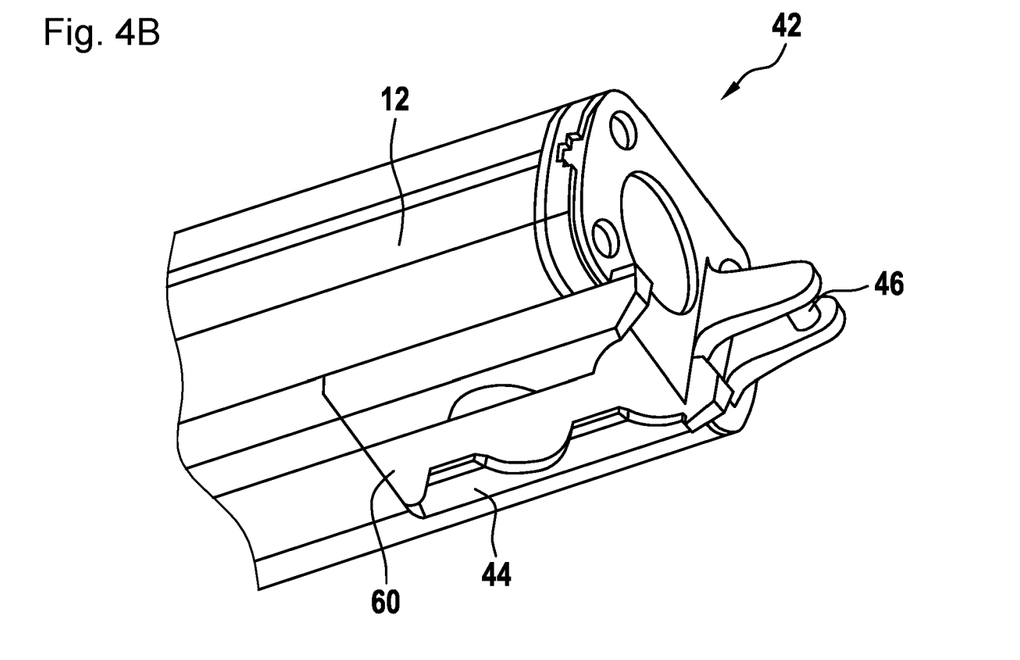
FIG. 4B shows a schematic representation of the carrier unit, including an energy storage unit.

FIG. 4A shows carrier unit 42 of holding device 10. Carrier unit 42 is provided for receiving and releasably supporting energy store 12. Carrier unit 42 includes a base plate having rounded-off corners. The base plate of carrier unit 42 has a plurality of screw holes, which are provided for screwing the carrier element onto energy store 12. Carrier unit 42 includes connecting element 46 and a carrier element 44. Connecting element 46 takes the form of a pin having a circular cross-section and is connected in one piece to a front side of the base plate of carrier unit 42, using two connecting legs parallel to each other. Carrier element 44 is formed in one piece with the base plate of carrier unit 42 and extends from the front side of the base plate of carrier unit 42, past a bottom edge of the base plate of carrier unit 42, in a direction running perpendicularly to the base plate of carrier unit 42. FIG. 4B shows carrier unit 42 together with energy store 12. Energy store 12 is connected to the base plate of carrier unit 42. Carrier element 44 forms a guide rail 60. Guide rail 60 is intended for guiding energy store 12 inside of holding device 10. Energy store 12 is situated above guide rail 60. To fix energy store 12 in position axially and lock it to holding device 10 releasably, connecting element 46 of carrier unit 42 may be pushed into locking unit 16 in a direction contrary to ejection direction 54 (cf. FIG. 2).

What is claimed is:

1. A holding device for releasably supporting an energy store on a frame, comprising:
    at least one locking unit, which is configured, in a locked state, to axially fix the energy store in position and releasably locking the energy store, the locking unit including:
        at least one first element that is movably supported on the locking unit and is in a locked position when the at least one locking unit is in the locked state;
        at least one second locking element that is movably supported on the locking unit and is configured to block movement of the first locking element out of the locked position; and
        a first tensioning unit that, when the first locking element is in the locked position, prestresses the first locking element in a direction out of the locked position by application of a force to the first locking element independent of the second locking element.

2. The holding device as recited in claim 1, wherein the energy store is an energy store for a bicycle, and the frame is a bicycle frame.

3. The holding device as recited in claim 1, wherein the first locking element and the second locking element are pivotable on the locking unit, and in the locked state.

4. The holding device as recited in claim 1, further comprising a second tensioning unit that prestresses the second locking element in a position of the second locking element in the locked state using a tensioning force.

5. The holding device as recited in claim 1, wherein the first tensioning unit is formed in such a manner, that when the locked state is ended, the first tensioning unit ejects the energy store, using the force.

6. The holding device as recited in claim 1, further comprising an actuating unit configured for toolless actuation of the locking unit by a user.

7. The holding device as recited in claim 6, wherein the actuating unit includes at least one security mechanism for protection against unauthorized actuation of the locking unit.

8. The holding device as recited in claim 1, wherein the locking unit includes at least one damping element configured to fix the energy store in position without play.

9. The holding device as recited in claim 1, wherein the locking unit has at least one contacting unit configured to contact the energy store electrically.

10. The holding device as recited in claim 1, wherein the first tensioning unit is a torsion spring.

11. The holding device as recited in claim 10, wherein the torsion spring is in physical contact with the first locking element and not the second locking element.

12. A frame, comprising:
    at least one holding device for releasably supporting an energy store on the frame, the holding device including at least one locking unit, which is configured, in a locked state, to axially fix the energy store in position and releasably locking the energy store, the locking unit including:
        at least one first locking element that is movably supported on the locking unit and is in a locked position when the at least one locking unit is in the locked state;
        at least one second locking element that is movably supported on the locking unit and is configured to block movement of the first locking element out of the locked position; and
        a first tensioning unit that, when the first locking element is in the locked position, prestresses the first locking element in a direction out of the locked position by application of a force to the first locking element independent of the second locking element; and
    at least one frame element, wherein the locking unit is integrated directly in the frame element.

13. The frame as recited in claim 12, wherein the frame is a bicycle frame.

14. A holding device for releasably supporting an energy store on a frame, the holding device comprising:
    a locking unit that:
        when the locking unit is in a locked state, releasably locks the energy store to axially fix the energy store in position; and
        includes:
            a first locking element;
            a second locking element corresponding to the first locking element and including a recess for fixing a connecting element situated on the energy store, the recess, when the locking unit is in the locked state, being arranged between a rotary axis of the first locking element and a rotary axis of the second locking element; and
            at least one tensioning unit that includes:
                a first tensioning element fixedly positioned on the first locking element which prestresses the first locking element when the locking unit is in the locked state; and
                a second tensioning element fixedly positioned on the second locking element which prestresses the second locking element when the locking unit is in the locked state.

* * * * *